United States Patent [19]
Pao et al.

[11] 3,718,868
[45] Feb. 27, 1973

[54] $I_2^{129}$ INVERTED LAMB DIP STABILIZED HE-NE LASER

[75] Inventors: Yoh-Han Pao; Joseph Dale Knox, both of Cleveland Heights, Ohio

[73] Assignee: Case Western Reserve University, Cleveland, Ohio

[22] Filed: July 20, 1970

[21] Appl. No.: 56,520

[52] U.S. Cl. ............. 331/94.5, 250/199, 324/0.5, 330/3, 350/6, 350/287, 350/252
[51] Int. Cl. ............................. H01s 3/02, H01s 3/22
[58] Field of Search ..... 331/94.5; 350/6, 7, 286, 287, 350/288, 310, 252; 74/56; 330/3; 324/0.5; 250/199

[56] References Cited

UNITED STATES PATENTS 2,137,286   11/1938   Herbig..................................350/252
3,396,343   8/1968   Wesselink...........................331/94.5
3,528,028   9/1970   Baird...................................331/94.5

OTHER PUBLICATIONS

Lee et al., Applied Physics Letters, 10, (11) 1 Jun. 1967, pp. 303–305.
Hanes et al., Metrologia, 5, 1969, pp. 32–33.
Schweitzer, Jr., Applied Physics Letters, 13, (11), 1 Dec. 1968, pp. 367–368.

Primary Examiner—Ronald L. Wibert
Assistant Examiner—R. J. Webster
Attorney—Sughrue, Rothwell, Mion, Zinn & Macpeak

[57] ABSTRACT

An extremely accurately resettable He-Ne laser including a gaseous $I_2^{129}$ absorption cell in the laser cavity, and a method of stabilizing a He-Ne laser on an Inverted Lamb Dip of $I_2^{129}$. The laser gain tube and absorption cell are enclosed in a novel laser cavity apparatus. The cavity mirrors are positioned by novel mirror adjusting means which permits the laser to be tuned very quickly.

7 Claims, 8 Drawing Figures

INTENSITY OF LASER OUTPUT

LAMB DIP

FREQUENCY (CAVITY LENGTH)

INTENSITY OF LASER OUTPUT WITH $I_2^{129}$ ABSORPTION CELL

INVERTED LAMB DIP

CENTER FREQUENCY OF ABSORPTION LINE

FREQUENCY (CAVITY LENGTH)

INVENTORS
YOH-HAN PAO
JOSEPH D. KNOX

BY Sughrue, Rothwell, Mion, Zinn & Macpeak

ATTORNEYS

I₂¹²⁹ STABILIZED
He-Ne LASER

He-Ne LASER
WITHOUT A
I₂¹²⁹ ABSORBING CELL

$I_2^{129}$ INVERTED LAMB DIP STABILIZED HE&NE LASER

FIELD OF THE INVENTION

The present invention relates to a novel system for controlling the accuracy of the wavelength of the output of He-Ne lasers operating in the visible 6328 A wavelength region to at least one part in $10^{11}$. More particularly it relates to the control of the wavelength by referencing the frequency of the laser output to the center frequencies of the hyperfine components or Inverted Lamb Dips of an absorption line of the vapor of iodine isotope $I_2^{129}$.

BACKGROUND OF THE INVENTION

In modern optics technology the highly monochromatic, highly directional and spatially coherent radiation available from stable gas lasers play an important role. In particular, such coherent radiation is used in interferometry to measure distances and changes in dimensions and in holography to record and display two or three dimensional images. In both these and other applications, it is important that the laser be operating at moderate power levels, in single mode i.e. at a single frequency, in a stable manner, and also preferably that the frequency be accurately resettable.

Actually, precision and accuracy are quite different things. Theory predicts and, experiment confirms, that the instantaneous intrinsic line width of the oscillating mode should be of the order of one Hertz or less for essentially all gas lasers. The work of Jaseja et al (see *Physical Review Letters*, Vol. 10, 1963, p. 165) shows that with some care lasers can be sufficiently stable so that oscillating bandwidths of a few tens of Hertz can in fact be obtained. However there is a problem in that, although the spectral width corresponds to an uncertainty in the instantaneous frequency of less than one part in $10^{13}$ (i.e., precision is very high), the resettability or accuracy of a given frequency in the visible region is generally on the order of one part in $10^8$ or at best five parts in $10^9$. This means that we known the nominally 6328 A wavelength radiation from a He-Ne laser is very monochromatic, but we do not know exactly what the frequency is, at least not to the desired accuracy. There is, therefore, a large gap between precision and accuracy.

In the literature two interesting methods have been proposed for improving the resettability or accuracy of the operating frequency of He-Ne lasers. One of them is based on the Lamb Dip and the other is based on the Inverted Lamb Dip. The Lamb Dip method is not really satisfactory because the absolute position of the center of the Lamb Dip shifts with the operating conditions of the laser. As the discharge current or pressure changes, the center of the Lamb Dip changes also (see A.L. Bloom and D.L. Wright, *Applied Optics*, Vol. 5, p. 1528 (1966); A.D. White, *Applied Physics Letters*, Vol. 10 (1967); and T. P. Sosnowski and W. B. Johnson, *IEEE J. Quantum Electronics*, QE5, p. 151 (1969)), and the accuracy of the operating frequency is impaired. The Inverted Lamb Dip scheme is much more satisfactory since in this latter case the reference is a passive absorption. Barger and Hall (*Physical Review Letters*, Vol. 22, No. 1, Jan. 6, 1969, pp. 4–8) have reported stabilizing He-Ne lasers on Inverted Lamb Dips in the 3.39μ infrared wavelength region due to absorbing methane cells in the cavity of the laser. Their results indicate that the operating frequency of such lasers can be set reproducibly to ± one part in $10^{11}$. Several investigators thought that the Inverted Lamb Dip due to iodine $I_2^{127}$ would be suitable as a reference frequency in the visible region. As shown by Hanes and Dahlstrom for the combination of $I_2^{127}$ vapor and an $He^3-Ne^{20}$ laser operating in the 6328 A region, there is not just one Inverted Lamb Dip but many due to the hyperfine splitting of the electronic transition. It turned out also that the Inverted Lamb Dips due to $I_2^{127}$ were not very prominent so that stabilization of $He^3-Ne^{20}$ lasers about such lines are not practical.

SUMMARY OF THE INVENTION

Our investigations have shown quite unexpectedly that the isotope of iodine namely $I_2^{129}$ is much more suitable for Inverted Lamb Dip stabilization purposes. Both $He^3-Ne^{20}$ and $He^3-Ne^{22}$ lasers can be stabilized in the visible 6328 A wavelength region with reference to the center frequency of any one of a large number of hyperfine components of what seems to be two separate vibrational-rotational lines of an electronic absorption.

It is accordingly the primary object of the present invention to provide an extremely accurate, i.e., reproducible or resettable, source of monochromatic radiation in the 6328 A region based on $He^3-Ne^{20}$ or $He^3-Ne^{22}$ lasers stabilized on Inverted Lamb Dips due to $I_2^{129}$.

It is another object of the invention to provide mechanically rugged and stable as well as accurate $He^3-Ne^{20}$ and $He^3-Ne^{22}$ lasers utilizing the vapor of $I_2^{129}$ for a reference and novel cavity mirror adjusting means for the realization of ultrastable cavities.

It is another object of the invention to provide a frequency or time standard based on the heterodyne or beat signal between two lasers stabilized about different Inverted Lamb Dips of gaseous $I_2^{129}$. The frequency may vary from a few MHZ to nearly two gigaHertz depending on which of the hyperfine components are used.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

The objects of the present invention are accomplished in general by an optical system comprising a He-Ne laser gain or discharge tube, a power supply for 129 of the He-Ne plasma within the tube, another sealed off light absorption tube for the iodine isotope $I_2^{129}$ vapor or gas including a temperature controlled reservoir for excess solid $I_2^{129}$, multilayer dielectric film cavity mirrors, a cavity made of ultra low expansion material, a detector for monitoring the intensity of the output, a piezoelectric crystal stack for varying the length of the cavity, and power supplies for the cathode as well as for the piezoelectric drive. Other associated electronic components include a temperature sensing and control unit for the iodine reservoir. The laser gain tube and the $I_2^{129}$ absorption tube are optically in series with each other, i.e., the 6328 A wavelength laser beam passes through both tubes while travelling through the laser cavity.

In the preferred form of the accurate frequency laser, the hyperfine component of the Inverted Lamb Dip used for stabilization is one with nearly flat background so that the apparent position of the center of the Inverted Lamb Dip does not change as the laser ages and the overall intensity decreases. In the time standard embodiment of the invention, this refinement is not possible, but a check of the shifts due to aging can be made independently.

The following discussion is believed to be an accurate description of the physical theory involved in the operation of the present invention.

Figure 1:
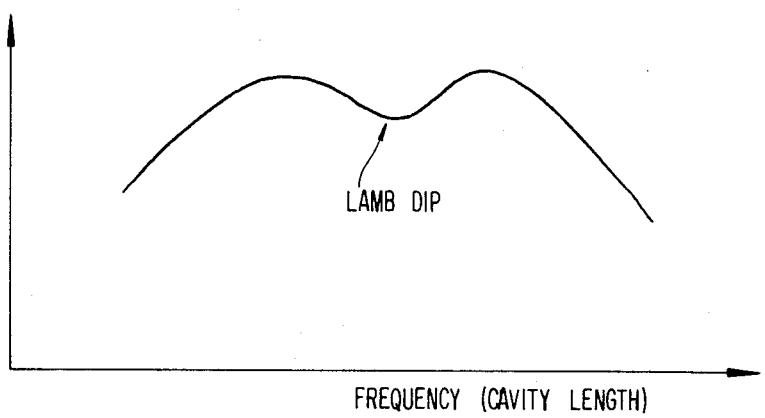
FIG. 1a is a graph illustrating the change of the intensity (including the Lamb Dip) of the output of a He-Ne laser as the frequency of operation (cavity length) is tuned through the gain curve of the Ne transition.
FIG. 1b is a graph illustrating the intensity (including the Inverted Lamb Dip) vs. frequency function of an He-Ne laser when a gaseous absorber is placed in a cell in the laser cavity.

A laser consists of a gain or discharge tube and a resonant cavity which provides for feedback so that oscillation will occur. For any two specific energy levels in (say) an atomic gas, there is gain at optical frequency $v$ if the population of the upper state is larger than that of the lower state and if the energy difference between the two states is $\Delta E = hv$ where $h$ is a quantum mechanical constant, Planck's constant. Any light of the right frequency is amplified on passing through the gain tube, and in a resonant cavity the build up in the intensity of the cavity field continues until the transition is nearly saturated, i.e., until the populations of the two levels are nearly the same. Actually, the populations are not exactly quite the same because some residual or saturated gain is required to balance the cavity loss. For the He-Ne laser, system gain may occur at any frequency within a bandwidth of nearly 1.2 bandwidth in the 6328 A region. This fairly broad gain curve is due to the fact that the Ne atoms have thermal motion, and the frequency of the transition is increased or decreased by the Doppler shift depending upon whether the atom in question is moving towards or away from the observer. As the frequency of the resonant cavity is tuned through the inhomogeneously broadened gain curve, the intensity of the output varies in a manner roughly similar to that of the gain curve. There is however an anomaly, a dip in the center of the output-versus-frequency (cavity length) curve. This decrease in the intensity is called the Lamb Dip in honor of Willis Lamb whose theory first drew attention to this feature (FIG. 1a). This decrease is due to the fact that the standing wave in the resonant cavity is actually composed of two running waves. As long as the operating frequency is not that of atoms with zero velocity, then the cavity derives gain from two species of atoms. Roughly one running wave derives gain from atoms with velocity $v$ going to the left, whereas the other wave derives gain from atoms with velocity $v$ going to the right. However, both species emit at the same frequency and contribute to the cavity node. As the center of the gain curve is approached, although the population density increases, the net gain decreases, because exactly at the line center only one species (i.e., with velocity $v = 0$ (i.e., contributes to the gain: hence, the Lamb Dip. An account of the quantitative theory for this phenomena is available from Bell and Sinclair, "Gas Laser Technology", Reinhold Publishers.

Figure 1B:
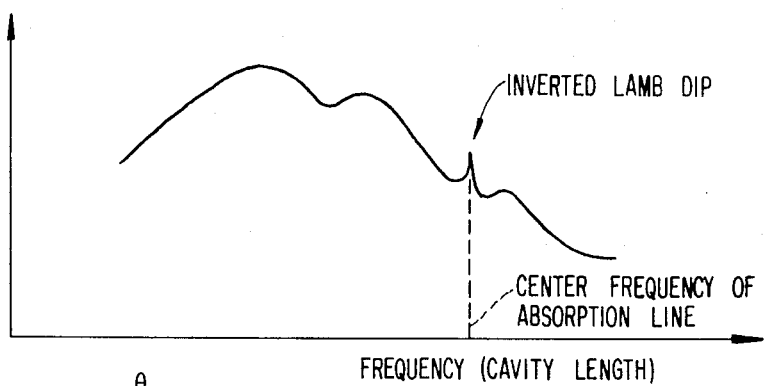

The Inverted Lamb Dip effect is also due to saturation of a transition, except that in this case, the effect is due to the saturation of a loss rather than a gain. Insertion of a gas which absorbs over part or all of the frequency interval of the laser gain curve certainly tends to decrease the intensity of the output of the laser. However, we must remember that the absorption of the absorbing gas is also inhomogeneously broadened. The high intensity of the cavity field tends to deplete the lower or ground state of the absorber, i.e., it tends to saturate the transition. The transition is the most saturated at the line center of the inhomogeneously broadened line of the absorber. The output versus frequency (cavity length) curve then shows an anomaly which has a width roughly equal to that of the homogeneous or natural linewidth of the absorbers and is positioned at the center of the inhomogeneously broadened line (FIG. 1b).

In the case of gaseous iodine $I_2^{129}$ the upper electronic state has a magnetic moment due to electronic orbital moment as well as an electronic spin moment, and the upper level is therefore split due to the interaction of these moments with the nuclear spin moments. In addition there are finer splittings due to magnetic moments caused by rotation of the molecule. The net result of these splittings is that there are a large number of Inverted Lamb Dips. These are called the hyperfine components of the Lamb Dip.

The absolute position of these Inverted Lamb Dip components are very slightly sensitive to external magnetic fields.

Figure 2:
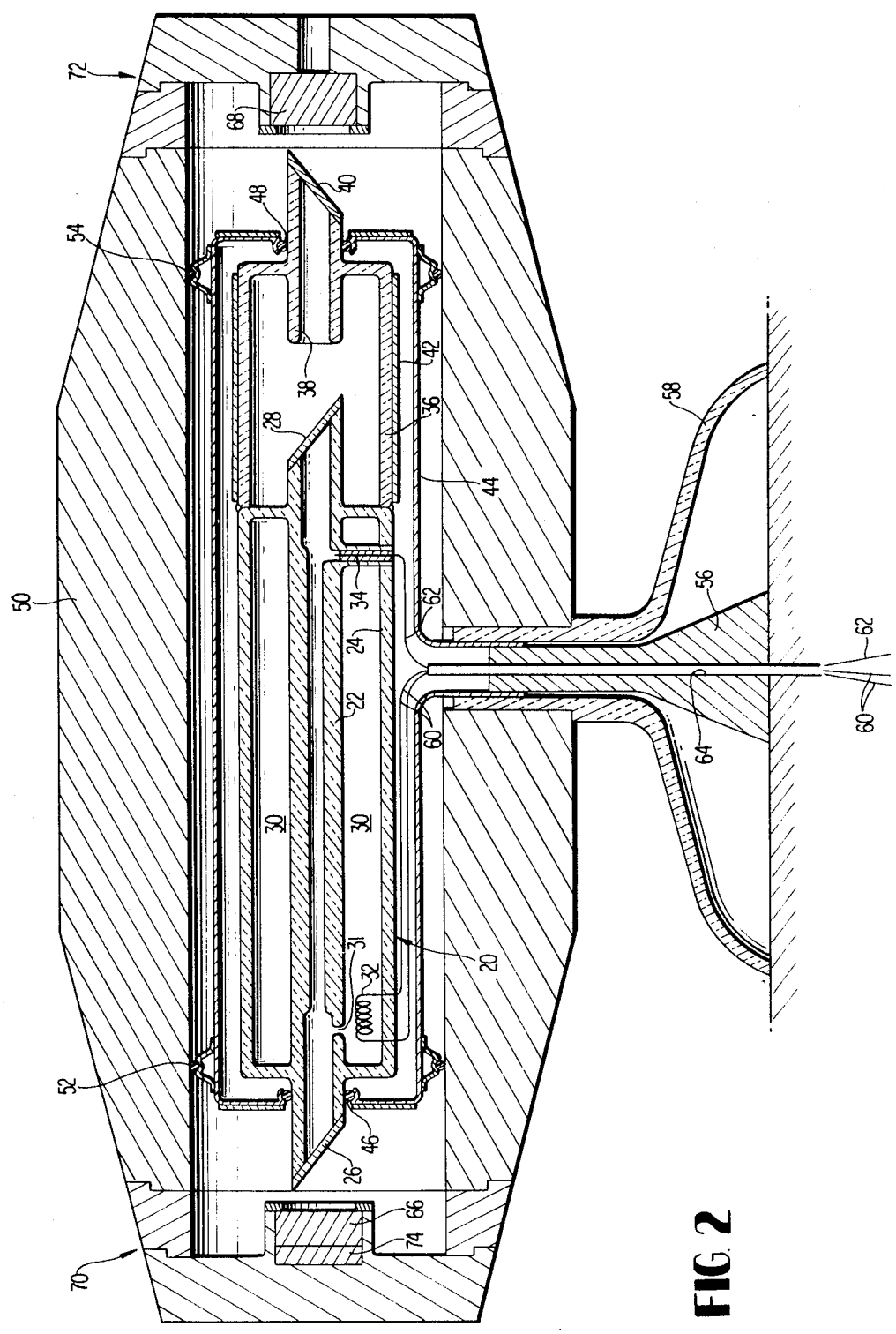
FIG. 2 is a schematic diagram of an improved structure of a $He^3-Ne^{20}$ of $He^3-Ne^{22}$ laser stabilized accurately according to the present invention.

The invention will now be described with respect to specific embodiments as exemplified by the drawings wherein FIG. 2 shows a very basic accurate stabilized He-Ne laser utilizing the principle of the present invention. The laser gain tube 20 itself consists of a pyrex glass tube 22 encased within another concentric pyrex tube 24. The inner pyrex tube 22 has two quartz Brewster angle windows 26 and 28 attached to its ends. The space 30 between the pyrex tubes serves as a reservoir for He-Ne gas which enters tube 22 through a port 31. The cathode 32 and the anode 34 are situated so that the discharge is along the bore of tube 22 itself. The concentric construction of the laser makes the laser tube mechanically rigid.

Another pyrex tube 36 is attached to tube 24. Part of tube 36 is of the same diameter as tube 24, and it also has a small bore section 38, having one open end and one end closed by a Brewster angle window 40. The space within tube 36 is filled with $I_2^{129}$ vapor initially at equilibrium with crystalline $I_2^{129}$ at 4°C. The gas reservoir formed by tube 36 is shielded with a mu metal sheath 42 to protect the gas from stray magnetic fields.

The entire laser tube and $I_2^{129}$ cell assembly is enclosed within a copper tube or shroud 44. The copper tube 44 supports the laser assembly through Teflon O-rings 46 and 48, and itself is supported in an Invar cylinder 50 by Teflon O-rings 52 and 54. The copper tube serves to conduct the heat generated in the plasma discharge to a metal heat sink 56. The laser cavity itself is formed by the Invar cylinder 50 which is massive in the middle but tapered towards both ends. The cylinder is supported by a rigid support base 58 fixed to the central portion of the cylinder 50. Base 58 is made of heat insulating material and thermally insulates cylinder 50 from the copper tube 44 and the heat sink 56. The electrical leads 60 and 62 from the cathode and the anode are brought out through a central bore 64 in the metal heat sink 56.

The laser cavity mirrors 66 and 68 are of the conventional multilayered dielectric type which are readily available commercially; however, they are attached to the cavity cylinder 50 and tuned by novel mirror adjusting assemblies 70 and 72, respectively. These assemblies are identical, and the structure of one is shown in detail in FIG. 3. The position of one of the mirrors may also be changed slightly by means of a piezoelectric crystal 74.

Figure 3:
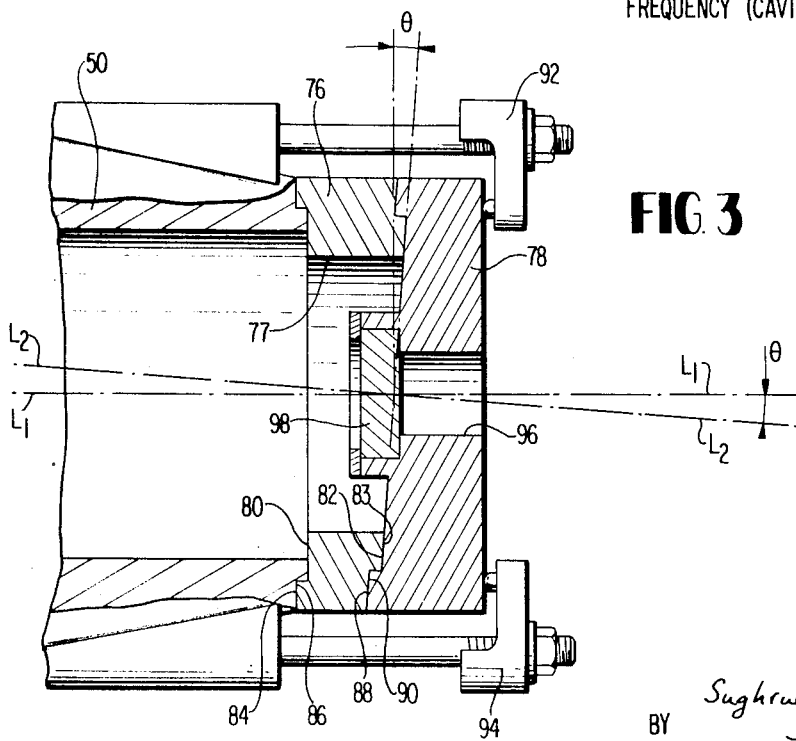
FIG. 3 is a cross-sectional view of a novel mirror adjusting assembly according to the invention.

As shown in FIG. 3, each mirror adjusting assembly consists of two cylindrical discs 76 and 78. The disc 76 is hollow, has a central bore 77, and is mounted on one end of the Invar cylinder 50 so that the disc may be rotated about a fixed axis $L_1 - L_1$ substantially coincident with the longitudinal axis of the laser cavity, while maintaining contact with the Invar cylinder. The plane of the inner end face 80 of disc 76 is perpendicular to axis $L_1 - L_1$ and parallel to the end surface of cylinder 50. However, the outer end face 82 is inclined at an angle $\theta$ relative to end face 80. In practice $\theta$ is not large, being on the order of 1°. The inner end face 83 of disc 78 is parallel to end face 82 with the result that end face 83 rotates about an axis $L_2 - L_2$ which is perpendicular to the plane of end face 82. The Invar cylinder and end face 80 of disc 76 have complementary interlocking rims 84 and 86, respectively, which keep disc 76 on cylinder 50 and also always keep the disc positioned concentrically relative to the cylinder. Similarly, interlocking rims 88 and 90 on the mating surface of discs 76 and 78, respectively, keep the discs locked to each other. In addition, the assembly of two discs are held in contact with the Invar cylinder 50 through gentle pressure exerted by a pair of adjustable clamps 92 and 94.

The disc 78 may have hollow central bore 96, as it would have to have when it is on the end of the laser, or the disc may be solid if it is positioned at the other end. The mirror 98 is attached to disc 78 within bore 77 and aligned with bore 96 so that the mirror is approximately perpendicular to axis $L_1 - L_1$ when discs 76 and 78 are positioned as illustrated in FIG. 3. Tuning of the cavity is quickly achieved by rotating disc 78 through 180° for any given position of disc 76, to vary the tilt of the mirror relative to axis $L_1 - L_1$ in one plane. If the laser does not then oscillate, disc 76 is rotated by say about 5°, and disc 78 is again rotated through 180° to vary the tilt of the mirror in another plane. This procedure is continued until the cavity is tuned. In practice, use of this novel mirror adjusting assembly increases the rigidity of the cavity, reduces the amount of mechanically induced noise, and greatly reduces the time required for tuning as compared with prior art adjusting means and methods.

Figure 4:
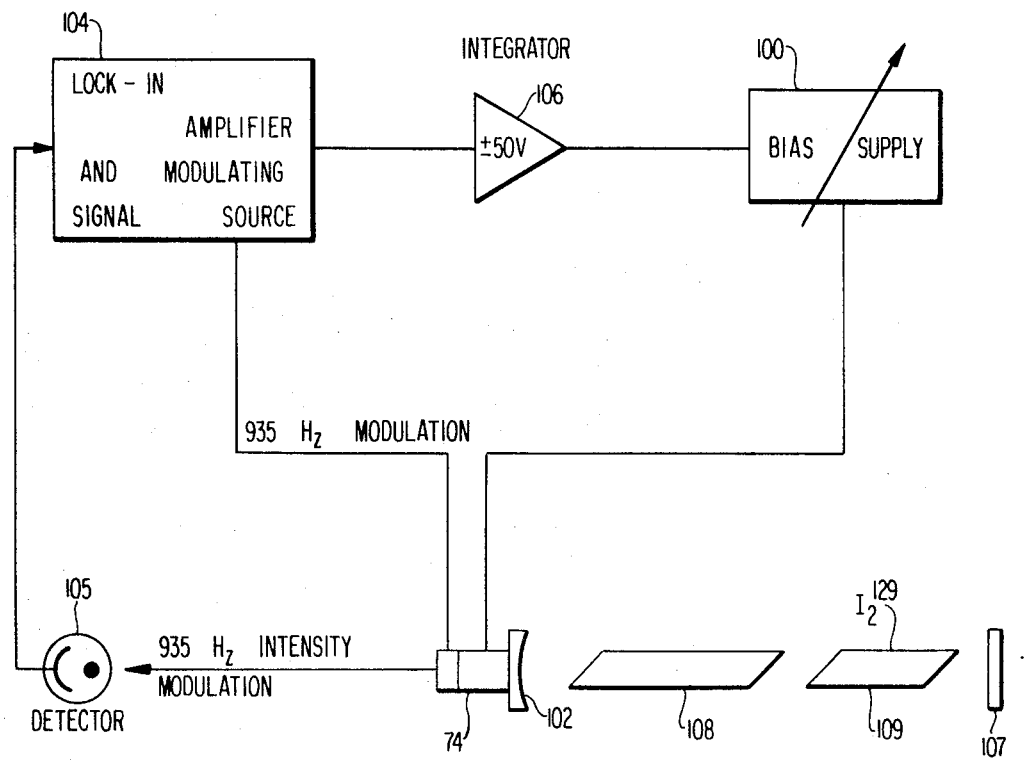
FIG. 4 is a block diagram of the electrical circuit used for locking or stabilizing the laser operation into any selected Inverted Lamb Dip of $I_2^{129}$.

The electrical circuit used for stabilizing a stable He-Ne laser about the Inverted Lamb Dip is shown schematically in FIG. 4. A bias supply 100, which determines the position of the piezoelectric crystal 74, the position of the mirror 102 and, therefore, also the length of the cavity, is first adjusted manually so that the laser indeed operates at the frequency of the peak of an Inverted Lamb Dip of $I_2^{129}$. In addition to this d.c. voltage an additional a.c. voltage at 935 Hz is supplied to the crystal from a lock-in amplifier and modulating signal source 104. This a.c. modulating voltage causes the mirror 102 to oscillate slightly so that the operating frequency of the laser is also modulated slightly. If the laser is exactly at the round peak of the Inverted Lamb Dip, the intensity of the laser output as detected by a photodetector 105 does not change, and the slope of the intensity as detected by the lock in amplifier 104 is either zero or averages to zero. The laser then continues to operate accurately at that frequency. However, should any disturbance cause the frequency of operation to drift away from the top of the Inverted Lamb Dip, the slope of the intensity versus frequency curve will always be non-zero and either consistently positive or consistently negative, depending on the direction in which the frequency has strayed. This resulting positive or negative signal is then integrated in the integrator 106 which in turn corrects the bias supply so that the operating frequency is restored to the correct value, namely that value for which no additional corrections are called for, because the derivative or slope of the intensity versus frequency curve is zero. The laser cavity is completed by a flat mirror 107, a He-Ne laser gain cell 108, and a gaseous $I_2^{129}$ absorption cell 109.

Figures 5A, 5B:
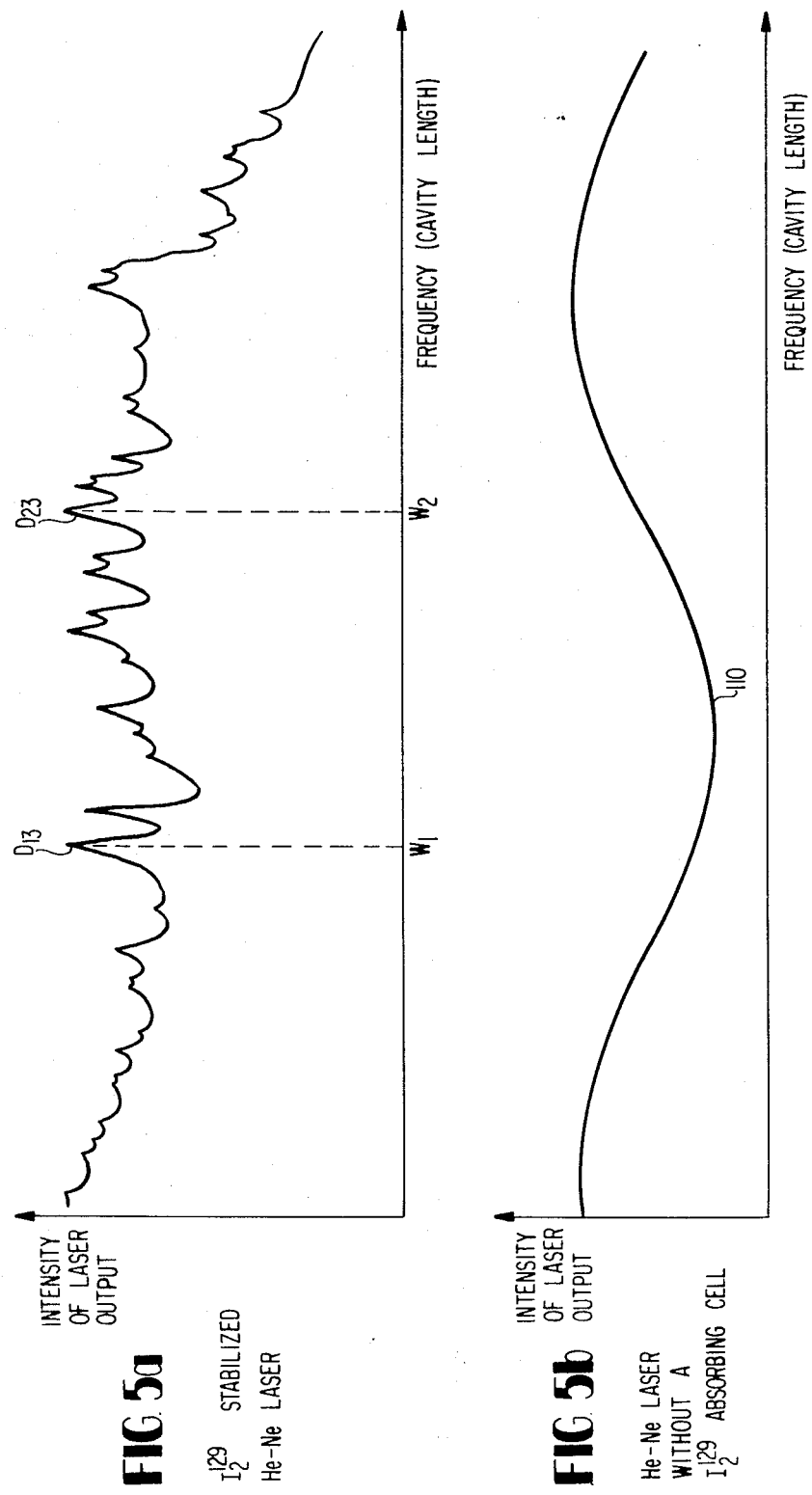
FIG. 5a is a graphical representation of the intensity vs. frequency (cavity length) of the output of an $I_2^{129}$ stabilized He-Ne laser.
FIG. 5b shows the laser output in the absence of an $I_2^{129}$ absorber.

FIG. 5a is a curve showing the intensity of the output of an $I_2^{129}$ stabilized He-Ne laser as a function of frequency or cavity wavelength. The positive peaks in the curve represent the hyperfine component of the Inverted Lamb Dip of $I_2^{129}$. Two of the Inverted Lamb Dips are identified as $D_{13}$ and $D_{23}$. FIG. 5b shows the output of the same laser without an $I_2^{129}$ absorbing cell. The Lamb Dip 110 is shown here.

Using the system illustrated in FIG. 4, the He-Ne laser is stabilized by tuning the cavity to a specific Inverted Lamb Dip such as $D_{13}$. The peaks of the Inverted Lamb Dips are much more prominent than $I_2^{127}$. Extremely high accuracy or resettability is achieved by always tuning the laser to the same Dip $D_{13}$. Even though we do not know the exact wavelength of the laser output, we do know the wavelength will always be the same if we tune to the same Inverted Lamb Dip each time the laser is operated.

Figure 6:
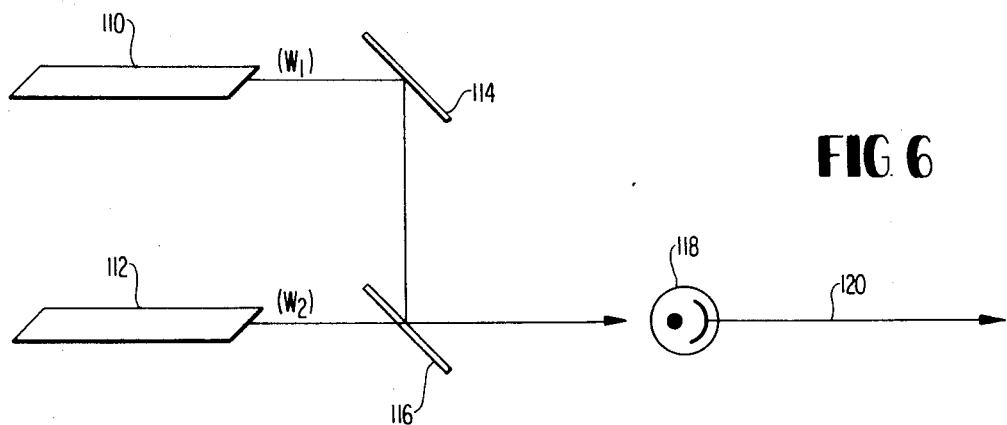
FIG. 6 is a schematic diagram of a frequency standard unit consisting of two stabilized lasers, one being an $He^3$-$Ne^{20}$ laser stabilized on one hyperfine component of $I_2^{129}$ and the other a $He^3$-$Ne^{20}$ or $He^3$-$Ne^{22}$ laser stabilized on another hyperfine component of $I_2^{129}$.

A compact, portable and accurate time standard can be constructed using two of the accurate lasers stabilized by reference to $I_2^{129}$ according to this invention. As shown in FIG. 6, one of the lasers 111 (which may either be $He^3\text{-}Ne^{20}$ or $He^3\text{-}Ne^{22}$) is stabilized at frequency $\omega_1$, corresponding to the position of Inverted Lamb Dip $D_{13}$ in FIG. 5a. The second laser 112 is stabilized about Inverted Lamb Dip $D_{23}$, for example, and its frequency of operation is designated $\omega_2$. Laser 112 may also either be a $He^3\text{-}Ne^{20}$ or a $He^3\text{-}Ne^{22}$ laser. The choice of the type of laser depends on how large the magnitude of the difference frequency needs to be. In practice, the difference frequency should be made as large as possible in the interest of relative accuracy. However, the Inverted Lamb Dip components in the $He^3\text{-}Ne^{22}$ region are not extremely prominent and in practice a pair of $He^3\text{-}Ne^{20}$ lasers are to be preferred. The output of laser 111 is directed by a mirror 114 onto a beam splitter 116 and from there to the photocathode of photodetector 118. The output of laser 112 goes through the beam splitter 116 and impinges also on the same photocathode surface. The photoelectric detector 118 is a square law detector, such as a silicon photodiode, so that its output on line 120 is a time varying electrical signal which contains a component at the difference or beat frequency between $\omega_1$ and $\omega_2$. This accurately controlled electrical signal is then used as an extremely accurate time standard.

While the invention has been particularly shown and described with reference to the preferred embodiments thereof, it will be understood by those skilled in the art that various changes in form and details may be made therein without departing from the spirit and scope of the invention.

We claim:
1. An extremely accurate laser device comprising:
   a. a first resonant laser cavity,
   b. a first He-Ne laser gain cell and a first gaseous $I_2^{129}$ light absorption cell disposed optically in series within said first cavity, the optical axis of said first cavity being co-linear with the optical axes of said first gain cell and said first absorption cell, and
   c. means for pumping said first gain cell to produce optical gain and oscillation,
   d. means for setting the frequency of the sustained oscillation at the frequency of a first inverted Lamb Dip of gaseous $I_2^{129}$, thereby producing a first output laser beam having a first frequency stabilized about the frequency of said first inverted Lamb Dip of gaseous $I_2^{129}$.

2. A method of accurately stabilizing the output laser beam wavelength of an He-Ne laser comprising passing the generated laser beam through gaseous $I_2^{129}$ located in a resonant laser cavity containing an He-Ne gain cell, and referencing the frequency of the laser beam to the frequency of an inverted Lamb Dip of gaseous $I_2^{129}$.

3. A method of accurately stabilizing the output laser beam wavelength of an He-Ne laser as defined in claim 2 wherein said referencing step comprises setting the frequency of the laser beam at the frequency of a hyperfine component of said inverted Lamb Dip.

4. A method of accurately stabilizing the output laser beam wavelength of an He-Ne laser as defined in claim 3 wherein the nominal output wavelength of the laser is 6328 A.

5. A laser as defined in claim 1 further comprising a housing enclosing said laser cavity, and a mirror position adjusting mechanism mounted on one end of said housing, said adjusting mechanism comprising:
   a. a first rotatable disc mounted on said housing for rotation about a fixed axis substantially coincident with the longitudinal axis of said laser cavity,
      1. said disc having a central bore therein,
      2. the inner face of said first disc engaging said housing, and the plane of said inner face being perpendicular to said fixed axis, and
      3. the plane of the outer face of said disc being inclined at an angle other than 90° to said fixed axis,
   b. a second rotatable disc rotatably mounted on said first disc and having an inner face continuously engaging and mating with the inclined outer face of said first disc and having an axis of rotation perpendicular to said first plane of said outer face of said first disc, and
   c. a cavity defining mirror disposed within said central bore of said first disc and fixed to said inner face of said second disc, such that, for at least one relative angular position of said first and second discs, the surface of said mirror is perpendicular to said axis of said laser cavity,
   so that, as said second disc is rotated through 180° for each angular position of said first disc, the angle between said laser cavity axis and said surface of said mirror is correspondingly varied.

6. A laser device as defined in Claim 1 further comprising:
   a. a second resonant laser cavity;
   b. a second He-Ne laser gain cell and a second gaseous $I_2^{129}$ light absorption cell disposed optically in series within said second cavity, the optical axis of said second cavity being co-linear with the optical axes of said second gain cell and said second absorption cell;
   c. means for pumping said second gain cell for producing optical gain and oscillation;
   d. means for setting the frequency of the sustained oscillation of said second gain cell at the frequency of a second inverted Lamb Dip of gaseous $I_2^{129}$, thereby producing a second output laser beam having a second frequency stabilized about said second inverted Lamb Dip of gaseous $I_2^{129}$; and
   e. light detector means responsive to said first and second laser beams for producing an electrical signal having a frequency component equal to the difference between said first and second frequencies.

7. A laser device as defined in claim 6 wherein said first and second frequencies are in the 6328 A region.

* * * * *

UNITED STATES PATENT AND TRADEMARK OFFICE
CERTIFICATE OF CORRECTION

PATENT NO. : 3,718,868
DATED : February 27, 1973
INVENTOR(S) : Yoh-Han PAO et al It is certified that error appears in the above-identified patent and that said Letters Patent are hereby corrected as shown below:

In the Heading:

The Assignee's name is incorrect. Should be:

-- QUANDIA CORPORATION --

Signed and sealed this 1st day of July 1975.

(SEAL)
Attest:

RUTH C. MASON
Attesting Officer

C. MARSHALL DANN
Commissioner of Patents
and Trademarks